May 20, 1924.
L. L. MARY NOW BY JUDICIAL CHANGE
OF NAME, L. L. LOMAR
SHOCK ABSORBER
Filed Jan. 9, 1922
1,494,495
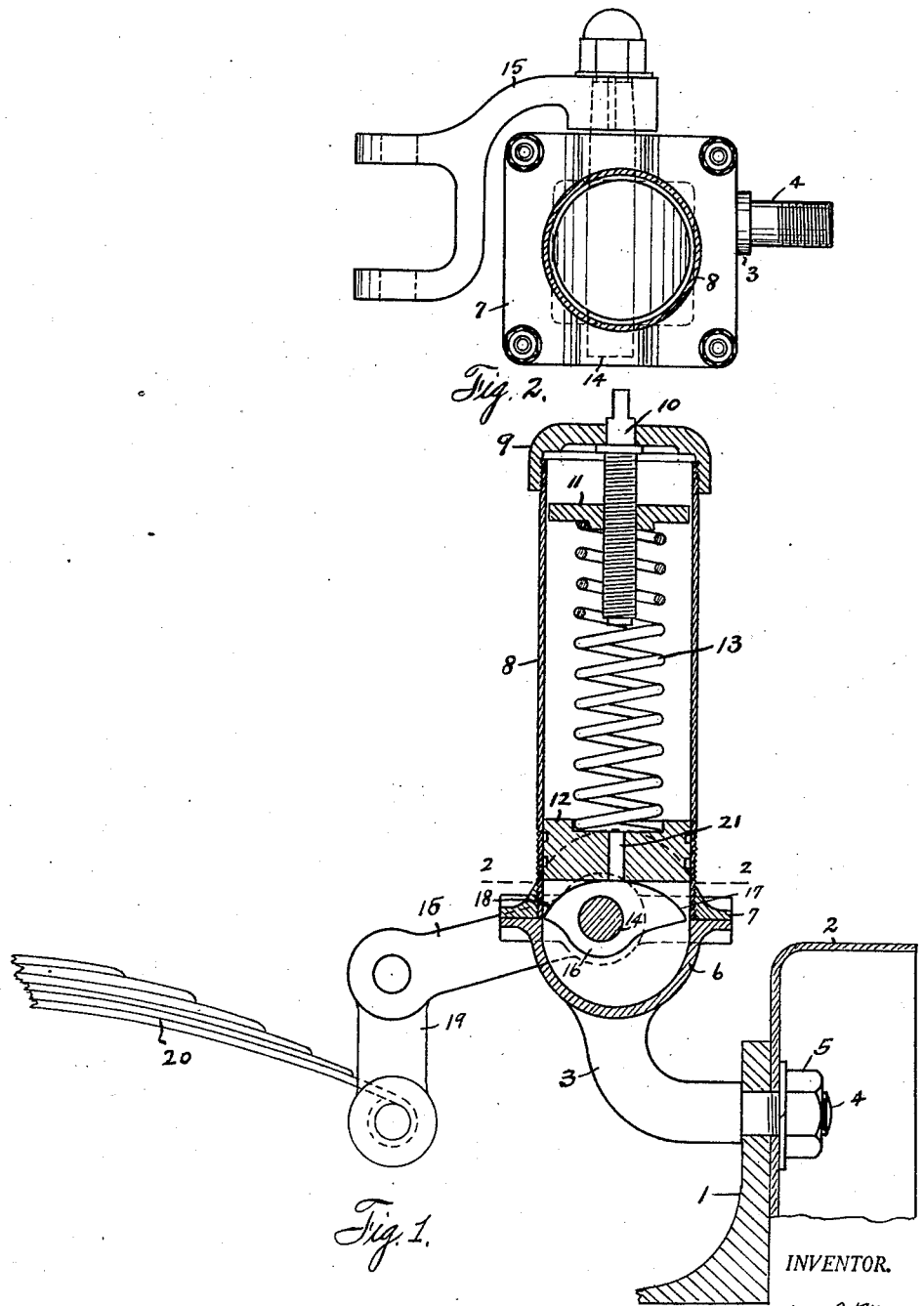

Patented May 20, 1924.

1,494,495

UNITED STATES PATENT OFFICE.

LOUIS L. MARY, OF HOUSTON, TEXAS, NOW BY JUDICIAL CHANGE OF NAME LOUIS LEON LOMAR.

SHOCK ABSORBER.

Application filed January 9, 1922. Serial No. 528,002.

*To all whom it may concern:*

Be it known that I, LOUIS L. MARY, now by judicial change LOUIS LEON LOMAR, citizen of the United States, residing at Houston, in the county of Harris and State of Texas, have invented certain new and useful Improvements in a Shock Absorber, of which the following is a specification.

This invention relates to new and useful improvements in a shock absorber.

The main object of my invention is to provide a shock absorber especially adapted for light automobiles,—having particular reference to Ford automobiles, which will be of simple, substantial construction, which can be furnished to the user at low cost, and which will absorb to great extent both the direct and rebound shocks transmitted thereto when the automobile is driven over rough roads, and thus effect easy riding qualities and prolong the life of the machine.

With the above and other objects in view the invention has particular relation to certain novel features of construction, operation and arrangement of parts, an example of which is given in this specification and illustrated in the accompanying drawings, wherein:—

Figure 1 shows a vertical sectional view of the shock absorber as applied to the rear spring of a Ford automobile, and Figure 2 is a transverse sectional view taken on the line 2, 2 of Figure 1.

Referring now more particularly to the drawings, the numeral 1 designates the rear axle brake housing and the numeral 2 designates the adjacent brake drum. The numeral 3 designates the spring perch having the reduced end 4 which projects through said housing and drum and is secured in place by the clamp nut 5. The outer end of the perch 3 is formed into a concaved, flanged bowl 6 to the flange of which there is bolted a coinciding flange 7 into which the lower end of the upstanding cylindrical casing 8 is screwed. The top of this casing is closed by a cap 9. The upper end of the adjusting rod 10 has a central bearing in this cap and its lower end is threaded through a disc 11. Fitted within the lower end of the casing there is a plunger 12 and a strong coil spring 13 is interposed between the disc 11 and the plunger 12.

The upper end of the upstanding rod 10 is formed to receive a wrench and by turning it the disc 11 may be adjusted to vary the tension of the spring.

There is a transverse shaft 14 mounted in suitable bearings in the bowl 6. One end of this shaft is extended and the arm 15 is keyed thereon. Fastened on the shaft, within the bowl there is a compound cam member 16 whose upper face is convex forming the unequal cam faces 17 and 18 which operate against the plunger 12. The outer end of the arm 15 is bifurcated and between its fingers there is pivoted the shackle 19 which supports the adjacent end of the spring 20.

In operation the casing is filled with oil which finds its way through the central duct 21 of the plunger and lubricates the cam faces. This duct also permits the passage of air through the plunger.

Shaft —14 is mounted off-center relative to the bearing housing —6 and tube —8 to provide for lengthening of cam face —17 which coacts with the spring seat or plunger —12 when the direct wheel shocks are transmitted through lever —15 and causes a correspondingly greater action on the absorbing spring —13,— the rebound action on the spring being received by the shorter cam face —18.

While the spring seat —12 is here shown as a piston or plunger fitting the cylinder —8, it is obvious that any suitable arrangement for seating the spring and transmitting the cam action thereto can be made without departing from the principle of construction here shown.

What I claim is:

1. A shock absorber, including a casing, fixed with respect to the axle housing, a yieldably mounted plunger therein, a member pivoted in the casing and formed with a convex surface comprising opposite cam faces which operate alternately against said plunger as direct and rebound shocks are transmitted thereto, and means connecting said member to the adjacent end of the vehicle spring.

2. A shock absorber, including a tubular casing, means for fixing the same with respect to the axle housing, a plunger in the casing, a yieldable member cooperating against one side of the plunger, means for varying the tension of said yieldable member, a member pivotedly mounted in the casing and formed with a convex surface which operates against the other side of said plunger and means for connecting said member to the adjacent end of the vehicle spring.

3. A shock absorber, including in combination with a casing, fixed with respect to the axle housing, a yieldable element in the casing, a compound cam mounted pivotally, off-center in said casing and comprising a cam actuating member attached to the adjacent end of the vehicle spring and opposite, convex cam faces adapted to coact alternately with said yieldable element to transmit direct and rebound shocks thereto.

4. A shock absorber comprising a casing fixed with respect to the axle housing, a yieldably mounted plunger therein, a member pivoted to the casing and having a curved surface opposite portions of which operate alternately against said plunger as direct and rebound shocks are transmitted thereto, and means connecting said pivoted member to the adjacent end of the vehicle spring.

5. A shock absorber comprising a casing secured to the axle housing, a yieldably mounted plunger therein, a member pivoted to the casing and formed with a curved surface comprising opposite convex cam faces which operate alternately against said plunger as direct and rebound shocks are transmitted thereto, and means connecting said pivoted member to the end of the vehicle spring.

In testimony whereof I have signed my name to this specification in the presence of two subscribing witnesses.

LOUIS L. MARY,
*Now by Judicial Change Louis Leon Lomar.*
Witnesses:
W. H. DUNLAY,
E. V. HARDWAY.